Dec. 10, 1929.  J. F. DIRZUWEIT  1,739,128
ELECTRIC TOASTER
Filed April 5, 1927
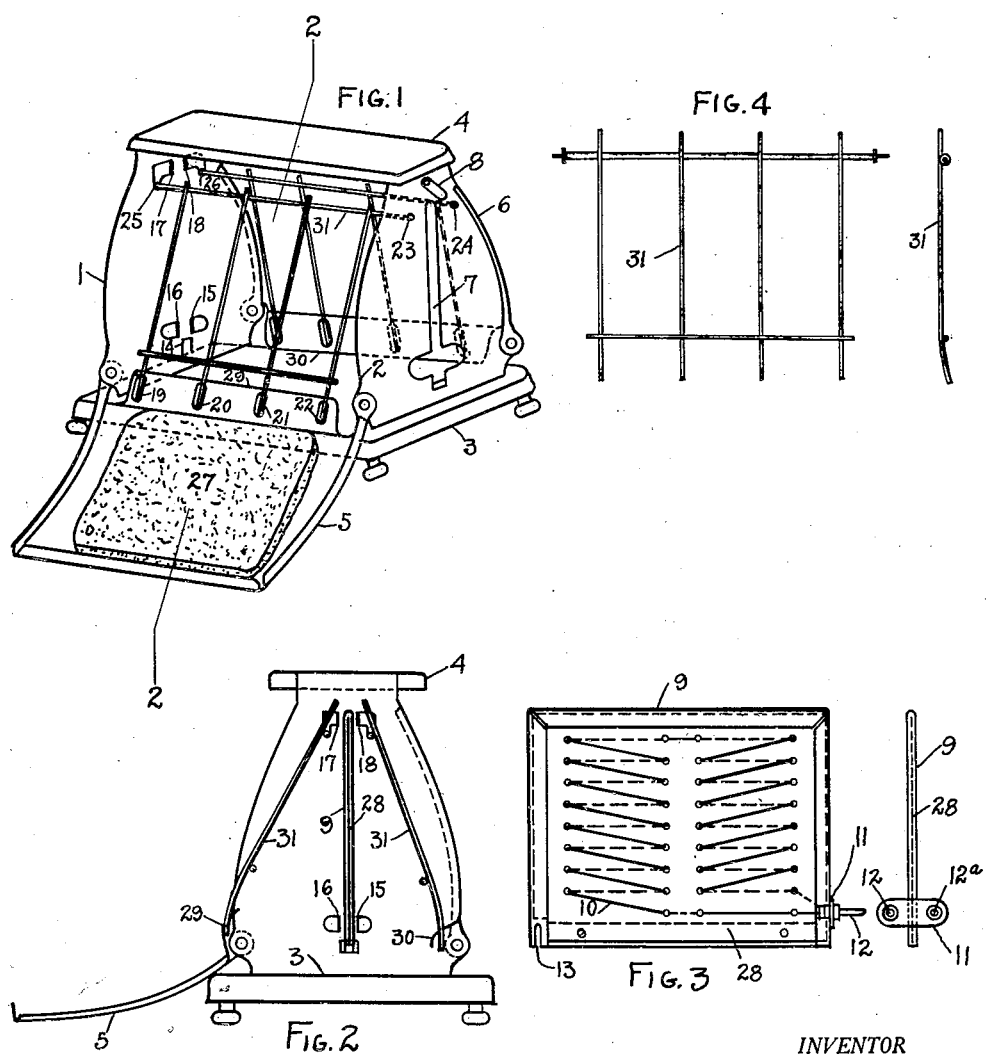

Patented Dec. 10, 1929

1,739,128

UNITED STATES PATENT OFFICE

JOHN F. DIRZUWEIT, OF BALTIMORE COUNTY, MARYLAND, ASSIGNOR TO WILLIAM W. VARNEY, OF BALTIMORE, MARYLAND

ELECTRIC TOASTER

Application filed April 5, 1927. Serial No. 181,188.

The object of my invention relates to apparatus used for toasting bread, and particularly those in which an electric resister or heating element is used as the means of producing the high temperature required to make toast.

A further object of my invention is the construction of an improved toaster whereby the heating element may be removed from the casing so that the same may be cleaned and washed, as desired.

A further object of my invention is the construction of a casing for an electric heating appliance enamelled within to be made more or less heat-resisting and for cleanliness, and plated without to protect from oxidation and to maintain its appearance.

A further object of my invention is an improved means for detachably securing within the casing of a heating appliance the electric heating elements.

A further object of my invention is an improved toaster, especially the grid or door elements co-operating therein, whereby the bread may be automatically turned on opening the door.

A further object of my invention is the construction of the various parts of a toaster to facilitate dis-assembling and cleaning, thereby preventing the retention of crumbs and oxidizable matter and the presence of disagreeable odors when in use.

With the foregoing and other objects in view, my invention consists of the novel construction, combination and arrangement of parts as herein specifically described and illustrated in the accompanying drawing, wherein is shown the preferred embodiment of my invention but it is understood that changes, variations and modifications can be resorted to which come within the scope of the claims hereunto appended.

In the drawings of the herein described embodiment of my invention, Figure 1 represents a perspective view of my improved toaster, one door being open showing a slice of bread in position thereon, the heating element being removed from the casing, which heating element is shown in Fig. 3; Fig. 2 is a cross-section view taken through 2—2 of Fig. 1; Fig. 4 is a view of the wire grating detached from the casing.

Similar numerals refer to similar parts throughout the several views.

1 and 2 are the side pieces, or ends, which are attached to base 3 and top 4. While the drawing shows these various members as separate, they may be stamped up and formed out of a single piece or blank and the shape can be varied from a flat top to a circular top, or otherwise, as suits the artist. 5 and 6 are doors hinged to ends 1 and 2, as shown in the drawings. These may be hinged to the base, or otherwise, as desired. I have curved these doors, as shown, for a special purpose, which curve performs the function of assisting in turning the bread during the process of toasting.

In one of the ends shown on end 2 I have an opening 7 through which the heating element may be introduced. This is sufficiently high for the heating element and at the bottom sufficiently wide to accommodate the terminal plate 11.

I provide a catch 8 at the top of the slit 7 to secure the heating element in place, the heating element being supported on one end by side lugs 15, 16, 17 and 18 and bottom hook or lug 14 which hooks into slots 13 of the heating element. The heating element consists of a frame 9 in which is secured a mica insulating material 28 which is threaded with a heat resisting element 10, the terminals of which terminate at terminal plate 11, as shown in Fig. 3. This structure gives me a portable, or detachable, heating element for use in my toaster that may be easily removed, cleaned, or otherwise handled as desired.

On doors 5 and 6 are base plates 29 and 30, preferably stamped integral therewith, shaped as shown in the end view (see Fig. 2). In these base plates are elongated openings 19, 20, 21 and 22 through which the lower ends of the wire grade pass and operate in the opening of the door. The operation of opening and closing of door 5 in conjunction with the wire grate 31 operating through these openings, reverses the position of the bread; that is, when one face thereof is exposed to the heat when the door is closed upon opening the door that face slides down in contact with the door, and when the door is closed again the top face of the bread is thrown against the wire grate, being the reverse of that previously exposed.

Referring to Fig. 3, of the drawing, 11 is the terminal plate which supports terminals 12 and 12ª, to which terminals the ends of resistance element 10 are attached.

Having thus described my invention, what I claim and desire to secure by Letters Patent is:

1. In an electric heater, provided with an electric heating element, a casing thereof comprising a metallic body coated adjacent to the heating elements thereof with a non-oxidizable heat resisting enamel.

2. In an electric heater, a casing thereof comprising a metallic body coated adjacent to the heating elements thereof with a non-oxidizable heat resisting material, the exterior of said body being coated with a non-oxidizable material, thereby forming a casing non-oxidizable within and without.

3. In a suitable metal container comprising a base plate, top plate, side pieces and hinged doors, means for movably attaching wire frames or grids to the side plates in relation to a series of oblong slots in the base of the hinged closing means, thereby forming a continuous jointed surface.

4. An electric toaster comprising a base plate, top plate, side pieces, hinged doors, wire grates and a frame containing a removable electric heating element, the surfaces of said parts coming in contact with food articles being coated with a heat resisting non-oxidizable vitreous enamel.

5. In an electric toaster, a container, an electric heating element comprising a frame, insulating material secured to said frame, and an electric resistance supported by said insulating material, terminals attached directly to said frame, means independent of said terminals for attaching said heating element within the container, an opening in one side of said container, said heating element and terminals as a unit being adapted to be withdrawn from the container through said opening without disconnecting the supply leads from said terminals.

JOHN F. DIRZUWEIT.